United States Patent
Yan et al.

(10) Patent No.: US 10,671,680 B2
(45) Date of Patent: Jun. 2, 2020

(54) CONTENT GENERATION AND TARGETING USING MACHINE LEARNING

(71) Applicant: Microsoft Technology Licensing, LLC, Redmond, WA (US)

(72) Inventors: Jinyun Yan, Sunnyvale, CA (US); Hsiao-Ping Tseng, Fremont, CA (US); Xiaoyu Chen, Sunnyvale, CA (US); Rupesh Gupta, Sunnyvale, CA (US); Romer E. Rosales, Burlingame, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 771 days.

(21) Appl. No.: 15/247,075

(22) Filed: Aug. 25, 2016

(65) Prior Publication Data

US 2018/0060749 A1    Mar. 1, 2018

(51) Int. Cl.
| | |
|---|---|
| G06F 16/9535 | (2019.01) |
| G06F 3/0482 | (2013.01) |
| G06N 20/00 | (2019.01) |
| G06Q 10/06 | (2012.01) |
| G06Q 50/00 | (2012.01) |
| G06Q 30/02 | (2012.01) |

(52) U.S. Cl.
CPC ........ *G06F 16/9535* (2019.01); *G06F 3/0482* (2013.01); *G06N 20/00* (2019.01); *G06Q 10/067* (2013.01); *G06Q 30/0201* (2013.01); *G06Q 50/01* (2013.01)

(58) Field of Classification Search
CPC ............... G06F 3/0482; G06F 16/9535; G06F 17/30867; G06N 7/005; G06N 20/00; G06N 99/005; G06Q 10/067; G06Q 30/0201; G06Q 50/00; G06Q 50/01
See application file for complete search history.

(56) References Cited

U.S. PATENT DOCUMENTS

| | | | |
|---|---|---|---|
| 8,671,093 B2 * | 3/2014 | Chapelle | G06F 16/951 707/723 |
| 2014/0019443 A1 * | 1/2014 | Golshan | G06F 16/9535 707/723 |
| 2018/0013844 A1 * | 1/2018 | Foged | H04L 51/32 |

* cited by examiner

*Primary Examiner* — Kamran Afshar
*Assistant Examiner* — Brent Johnston Hoover
(74) *Attorney, Agent, or Firm* — Schwegman Lundberg & Woessner, P.A.

(57) ABSTRACT

A system and method for content generation and targeting using machine learning are provided. In example embodiments, a probability that a user will visit a webpage based on historical data is calculated. A probability that the user will engage with a particular content category based on past user engagement is calculated. In response to the probability of the user engaging with the particular content category being equal to or greater than a first threshold, the content is generated. Further, in response to the probability of the user not visiting a webpage meeting or exceeding a second threshold, the generated content is sent to the user.

20 Claims, 7 Drawing Sheets

US 10,671,680 B2

CONTENT GENERATION AND TARGETING USING MACHINE LEARNING

TECHNICAL FIELD

Embodiments of the present disclosure relate generally to machine learning and, more particularly, to content targeting and generation using machine learning.

BACKGROUND

Content generation has previously been based on a set time or event trigger, where after a specific amount of time or an occurrence of an event, content is generated and sent. Generally, the process involves generating content based on a time trigger, ranking the generated content, and a subsequent decision whether to send the generated content (e.g., an email that includes the generated content). Often, this process includes content being generated and sent at specific time intervals with predictable updates or notifications of a recent event, thereby resulting in unnecessary use of resources to generate content that is of little interest to the user.

BRIEF DESCRIPTION OF THE DRAWINGS

Various ones of the appended drawings merely illustrate example embodiments of the present disclosure and cannot be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various embodiments, a system generates content that is relevant to a specific user, where the content being generated keeps the specific user engaged or re-engages the specific user to a website. For example, the system determines the probability that a user would visit a website within a predetermined period of time. The probability that the user will visit the website is based on past user engagement of the user (e.g., the user browsing content on the website) and past engagement of other users with similar member profiles (e.g., member profiles of a social networking service that each include member data such as the user's job history, the user's educational history, etc.). When the probability indicates the user is unlikely to visit the website (e.g., measured by a visiting threshold), the system continues to determine the probability whether the user would engage with specific content. The system generates the content based on the high probability that the user would actually engage with the content (e.g., measure by an engagement threshold). In this way, the system avoids spamming users with too many messages that are not of interest to the user.

Figure 1:
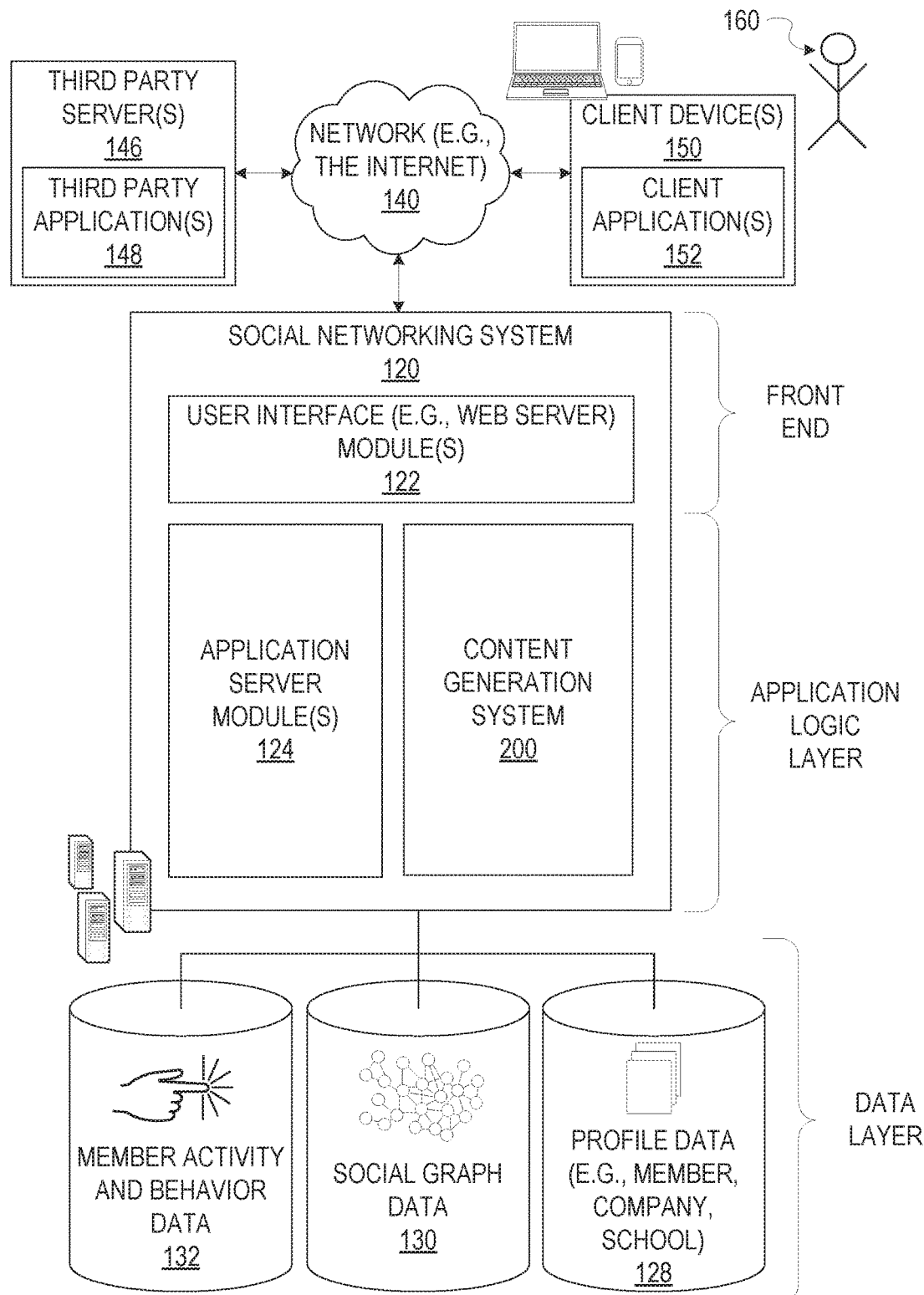
FIG. 1 is a network diagram depicting a client-server system within which various example embodiments may be deployed.

As shown in FIG. 1, the social networking system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social networking system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such an architecture.

As shown in FIG. 1, the front end layer consists of a user interface module(s) (e.g., a web server) 122, which receives requests from various client-computing devices including one or more client device(s) 150, and communicates appropriate responses to the requesting device. For example, the user interface module(s) 122 may receive requests in the form of Hypertext Transport Protocol (HTTP) requests, or other web-based, Application Programming Interface (API) requests. The client device(s) 150 may be executing conventional web browser applications and/or applications (also referred to as "apps") that have been developed for a specific platform to include any of a wide variety of mobile computing devices and mobile-specific operating systems (e.g., iOS™, Android™, Windows® Phone). For example, client device(s) 150 may be executing client application(s) 152. The client application(s) 152 may provide functionality to present information to the user and communicate via the network 140 to exchange information with the social networking system 120. Each of the client devices 150 may comprise a computing device that includes at least a display and communication capabilities with the network 140 to access the social networking system 120. The client devices 150 may comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. One or more users 160 may be a person, a machine, or other means of interacting with the client device(s) 150. The user(s) 160 may interact with the social networking system 120 via the client device(s) 150. The user(s) 160 may not be part of the networked environment, but may be associated with client device(s) 150.

As shown in FIG. 1, the data layer includes several databases, including a database 128 for storing data for various entities of the social graph, including member profiles, company profiles, educational institution profiles, as well as information concerning various online or offline groups. Of course, with various alternative embodiments, any number of other entities might be included in the social graph, and as such, various other databases may be used to store data corresponding with other entities.

Consistent with some embodiments, when a person initially registers to become a member of the social networking service, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database 128.

Once registered, a member may invite other members, or be invited by other members, to connect via the social networking service. A "connection" may specify a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases.

As members interact with various applications, content, and user interfaces of the social networking system 120, information relating to the member's activity and behavior may be stored in a database, such as the database 132. The social networking system 120 may provide a broad range of other applications and services that allow members the opportunity to share and receive information, often customized to the interests of the member. For example, with some embodiments, the social networking system 120 may include a photo sharing application that allows members to upload and share photos with other members. With some embodiments, members of the social networking system 120 may be able to self-organize into groups, or interest groups, organized around a subject matter or topic of interest. With some embodiments, members may subscribe to or join groups affiliated with one or more companies. For instance, with some embodiments, members of the social network service may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of the database 130.

The application logic layer includes various application server module(s) 124, which, in conjunction with the user interface module(s) 122, generates various user interfaces with data retrieved from various data sources or data services in the data layer. With some embodiments, individual application server modules 124 are used to implement the functionality associated with various applications, services and features of the social networking system 120. For instance, a messaging application, such as an email application, an instant messaging application, or some hybrid or variation of the two, may be implemented with one or more application server modules 124. A photo sharing application may be implemented with one or more application server modules 124. Similarly, a search engine enabling users to search for and browse member profiles may be implemented with one or more application server modules 124. Of course, other applications and services may be separately embodied in their own application server modules 124. As illustrated in FIG. 1, social networking system 120 may include a content generation system 200, which is described in more detail below.

Additionally, a third party application(s) 148, executing on a third party server(s) 146, is shown as being communicatively coupled to the social networking system 120 and the client device(s) 150. The third party server(s) 146 may support one or more features or functions on a website hosted by the third party.

Figure 2:
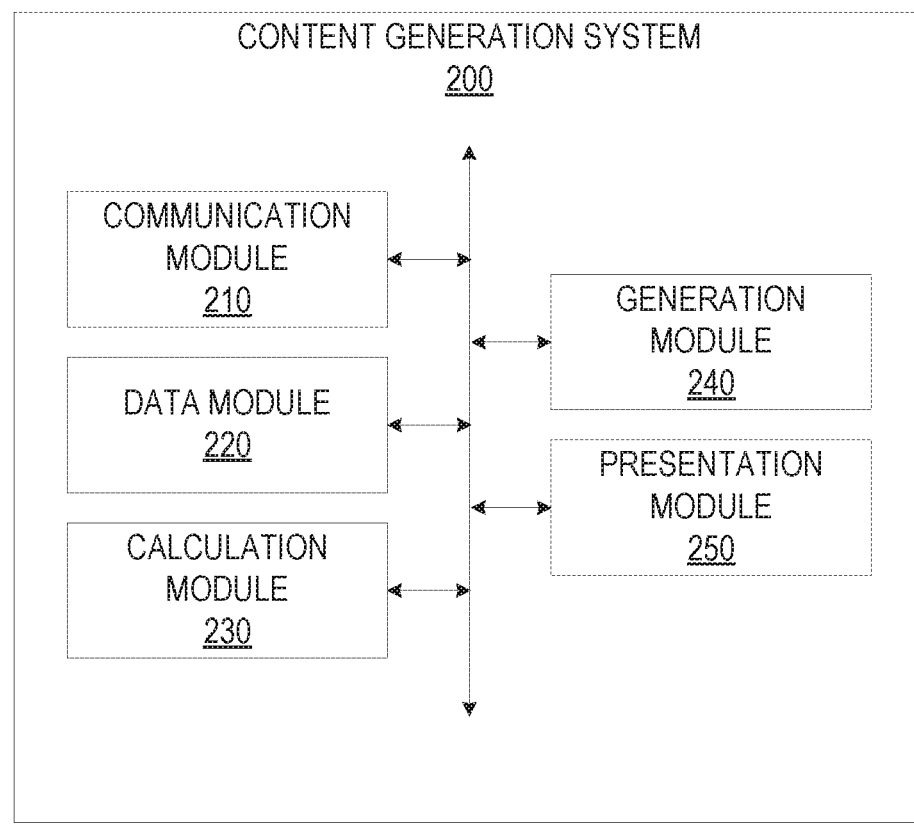
FIG. 2 is a block diagram illustrating a content generation system from FIG. 1, according to an example embodiment.

FIG. 2 is a block diagram illustrating components provided within the content generation system 200, according to some example embodiments. The system 200 includes a communication module 210, a data module 220, a calculation module 230, a generation module 240, and a presentation module 250. The content generation system 200 determines the probability whether a user would visit the social network within a predetermined period of time. In response to the probability of not visiting exceeding a threshold, the system 200 generates content to send to the user, the content being generated based on an affinity the user has in engaging with the content. Further, the frequency with which the content is generated and sent is a function of the probability of not visiting in view of the generated content. All, or some, of the modules are configured to communicate with each other, for example, via a network coupling, shared memory, a bus, a switch, and the like. It will be appreciated that each module may be implemented as a single module, combined into other modules, or further subdivided into multiple modules. Any one or more of the modules described herein may be implemented using hardware (e.g., a processor of a machine) or a combination of hardware and software. Other modules not pertinent to example embodiments may also be included, but are not shown.

The communication module 210 is configured to perform various communication functions to facilitate the functionality described herein. For example, the communication module 210 may communicate with the social networking system 120 via the network 140 using a wired or wireless connection. The communication module 210 further sends generated content to a target user (e.g., via an email or another communication modality). The communication module 210 may also provide various web services functions such as retrieving information from the third party servers 146 and the social networking system 120. In this way, the communication module 220 facilitates the communication between the content generation system 200 with the client devices 150 and the third party servers 146 via the network 140. Information retrieved by the communication module 210 may include profile data corresponding to the user 160 and other members of the social network service from the social networking system 120.

The data module 220 is configured to provide various data functionality such as accessing, exchanging, and storing information with databases or servers. For example, data module 220 may store and access member data from various databases including member activity and behavior data 132, social graph data 130, and profile data 138. In an example, the data module 220 receives data from users as they engage with the social network, or another website, and stores user historical data including the past log in history, latency between log in, number of times the user visited a webpage, the number of times the user engaged with a feed activity page, the number of times the user searched for a job, accepted an invitation, viewed a job recommendation, engaged with another member's activities, shared a content, liked a content, commented on a content, and the like. Further, the historical data stores types of activities, by category, that the user engages with, the activities can be ranked by category in the order of most engaged with by each specific user. In some example embodiments, the data module 220 may exchange information with third party servers 146, client devices 150, and other sources of information.

In various embodiments, the calculation module 230 is configured to determine the probability whether a user would visit the social network within a predetermined period of time. For instance, when the period of time is set to seven days, the calculation module 230 determines whether the user will visit the social network within the next seven days. In a specific embodiment, the predetermined period of time used to determine the probability that a user will visit the social network depends on the profession of the user. For instance, a profession that requires the user to use a computer every day (e.g., a software engineer, attorney, and the like) would be expected to visit the social network more frequently than a profession that requires a user to travel frequently (e.g., a sailor, trucker, and the like). In this example, the period of time for the software engineer is set to seven days whereas the period of time for the sailor is set to one month.

In various embodiments, the probability that a user will visit or otherwise engage with the website is calculated using a machine learning algorithm such as a logistic regression model based on input variables that affect the probability whether a user would visit. Logistic regression is just an example of a statistics-based machine learning technique used to predict the probability of an occurrence of an event given a set of independent/predictor variables. In various embodiments, the systems and methods described herein can employ other machine learning models and prediction techniques such as a Naïve Bayes model, a support vector machines (SVM) model, a decision trees model, or a neural network model. In one embodiment, the input variables are based on the specific user's historical data including the past log in history, latency between log in, number of times the user visited a webpage, the number of times the user engaged with a feed activity page, the number of times the user searched for a job, accepted an invitation, viewed a job recommendation, engaged with another member's activities, shared a content, liked a content, commented on a content, and the like. Each of these input variables led to the actual response of the user visiting the social network and thus a positive indicator of calculating probability of future visit and engagement. In other embodiments, the input variables are further based on activities of other members with a similar member profile as the user. In these embodiments, the calculation module 230 identifies members that are similar to the user by comparing the user's member profile with member profiles of other users. Member profiles are determined to be similar based on a comparison of the member profiles, which include school attended, current job title, current company, interest, skill set, and the like. Including activities of similar members as input variable in the probability determination are effective in scenarios where there are not enough activity data for each individual user in order to create an effective machine learning model for accurate prediction of probability of visit.

In various embodiments, the input variables are used to train a machine learning model by feeding these past activities of users and similar members to train the model. In various embodiments, the machine learning model is trained offline (e.g., not in real time) and can be employed to make predictions offline or in real time. In some embodiments, the machine learning model uses logistic regression to determine the relationship between the input variable to predict the probability whether a user would visit. In a specific example, a logistic regression model is used to determine how p (e.g., the probability of whether the user would visit) may be affect by X (e.g., input variables) and represented as follows:

$$p=\text{logistic}(\Sigma_i \beta_i X_i)$$

In this equation, the probability whether the user would visit, p, is dependent on the constant coefficient $\beta_i$, and input variable $X_i$, where i is the specific historical data feature including the past log in history, latency between log in, number of times the user visited a webpage, the number of times the user engaged with a feed activity page, the number of times the user searched for a job, accepted an invitation, viewed a job recommendation, engaged with another member's activities, shared content, "liked" content, commented on content, and the like. Such a model is trained and used to predict the probability whether a user will visit within the days of interest.

In various embodiments, the calculation module 230 is configured to determine the probability that a user would engage with content based on a content feature and user feature (described in more detail below). The determination whether the user would engage with content is determined based on whether the user would click on the content or not. For instance, the user is sent an email, and the user clicks on a selectable interface that directs the user to the social network; thus, the user has engaged with the email. Content feature is one attribute that is used to determine probability of user engagement, where the content feature is determined based on all past content sent to the user and the associated response elicited from the user (e.g., whether the user acted upon the content by clicking on the content), other past content associated with an action by the user (e.g., the user shared an article, commented on an article, searched for a job and looked at specific jobs, "liked" content, actions between members, and the like). In other words, content feature is determined based on past content sent to the user that has elicited some type of user engagement via user action. From such past user engagement, the past content is used as input for a machine learning model to determine the likelihood that the user would engage in content similar to that of the past content. In some embodiments, determining the probability that a user would engage with a content based on content feature includes determining the affinity a user has to a specific category of the content. Past content associated with some user action are placed in different categories, the categories including job search (e.g., content associated with job searches), building connections (e.g., content associated with adding other members to the user's social network connection), trending now (e.g., content associated with articles and postings that have high reader visibility), and the like.

In various embodiments, user feature is another attribute that is used to determine probability of user engagement, where the user feature includes activities specific to the user. Examples of such user features include, but are not limited to, the number of times a user visited a specific site, the number of times the user commented, liked, shared, or engaged with a content, member intent, member profile, other activities specific to the member, and the like.

In a specific example, a logistic regression model is used to determine the probability of whether the user would engage with a content. In one embodiment, the probability, p, is represented as follows:

$$p = \text{logistic}(\Sigma_i \gamma_i CO_i + \Sigma_i r_i f_i + \Sigma_{ij} \delta_{ij} CO_i f_i)$$

In this equation, the probability whether the user would engage with a content, p, is dependent on the constant coefficient $\gamma_i$, $r_i$, $\delta_{ij}$, and prediction variable $CO_i$ (e.g., content feature), and prediction variable $f_i$ (e.g., user feature) where i is each specific content feature and user feature. The output of the logistic regression model is the determination of the probability whether the user would click on the content using the user's behavior in the past or user behavior of similar members.

In further embodiments, the logistic regression model, further accounts for the timing of the past action executed by the user. As a user's interest may change over time, it is possible that the content that would likely engage the user will also change with the user's interest. Thus, where it is not necessary to use old data (e.g., where the amount of user data is high resulting from the user frequently logging in), newer data is used to train and predict future engagement with content. For instance, where the user frequently interacts with the social network by logging in frequently, older content feature and user features are not used to train the machine learning model. A high frequency of interaction results in a large amount of user activity data that can be collected and train the machine learning model. In such a scenario, recent data would more accurately reflect the prediction whether the user would interact with a specific content. In an example, the calculation module 230 determines whether the frequency of a user's log in rate is above a specific set threshold. In response to the frequency being above a specific threshold, the calculation module 230 shortens the time range of activity data that it uses in the machine learning model to determine the probability of a user engagement. In other embodiments, the calculation module 230 uses the most recent number of activities, N, where an N number of activities is a predetermined number for accurate prediction analysis.

In various embodiments, the probability of whether a user will engage with content is dependent upon actions the user has taken the past, rather than focusing on actions taken by others within the user's network. The calculation module 230 calculates the affinity of the specific user to specific content; thus, actions by other users do not influence the calculation.

In various embodiments, the generation module 240 generates the content, in response to the probability of the user engaging with a candidate piece of content crossing (e.g., equal to or exceeding) a predetermined engagement threshold. The generation module 240 generates the content based on a high probability that the user would actually engage with the candidate piece of content and, thereby, effectively reduces the amount of communication that doesn't interest the user. That is to say, the generation module 240 evaluates candidate pieces of content to be included in a communication content (e.g., contents of an email message to the user) based on engagement probabilities for the candidate pieces of content (e.g., the generation module 240 includes a particular candidate piece of content in the communication content when the engagement probability for the particular candidate piece of content transgresses a predetermined threshold). In this way, communication being generated for a user is selective for the specific user and sent at a frequency that avoids spamming users with too many messages. Thus, when user activity is low, the user is targeted for selective content generation based on the specific user's past engagement, which thus increases the number of active users engaging with the social network.

In some embodiments, a single content with the highest probability of the user engaging with the content is generated and sent, with the model checking the probability of the user engagement being set to a specific frequency. For instance, where the user is likely to not visit the social network in the next seven days, then a single content with the highest probability to engage the user is generated and sent. The frequency with which the content is generated is then checked every seven days, according to one example embodiment. Further, the frequency in which the content is generated and sent is based on the probability of not visiting. In other words, the frequency in which various content is sent is not more frequent than the model checking for the probability with which a user visits a webpage. For instance, if the model checks whether the user would visit within a month (e.g., the probability is checked every month), then the probability is unlikely to be affected by a daily or weekly decision of sending a content and therefore should not be sent more frequently than time period set by the calculation module 230 in checking the probability whether a user would visit. Where the probability that the user would not visit increases, the resulting frequency of content being sent also increases.

In some implementations, the presentation module 250 is configured to cause presentation of the generated content to the intended user. The generated content may be presented at various communication channels including text-messaging channels (e.g., Short Message Service (SMS) messages, Multimedia Messaging Service (MMS), Enhanced Messaging Service (EMS), Instant Messager (IM), and so forth), other messaging applications (e.g., WhatsApp, WeChat, and the like), push notification or other similar types of notification, or a combination thereof. In various implementations, the presentation module 250 presents or causes presentation of information (e.g., visually displaying information on a screen, acoustic output, haptic feedback). Interactively presenting information is intended to include the exchange of information between a particular device and the user of that device. The user of the device may provide input to interact with a user interface in many possible manners such as alphanumeric, point based (e.g., cursor), tactile, or other input (e.g., touch screen, tactile sensor, light sensor, infrared sensor, biometric sensor, microphone, gyroscope, accelerometer, or other sensors), and the like. It will be appreciated that the presentation module 250 provides many other user interfaces to facilitate functionality described herein. Further, it will be appreciated that "presenting" as used herein is intended to include communicating information or instructions to a particular device that is operable to perform presentation based on the communicated information or instructions via the communication module 210, data module 220, calculation module 230, and generation module 240. The data module 220 is configured to provide various data functionality such as exchanging information with databases or servers.

Figure 3:
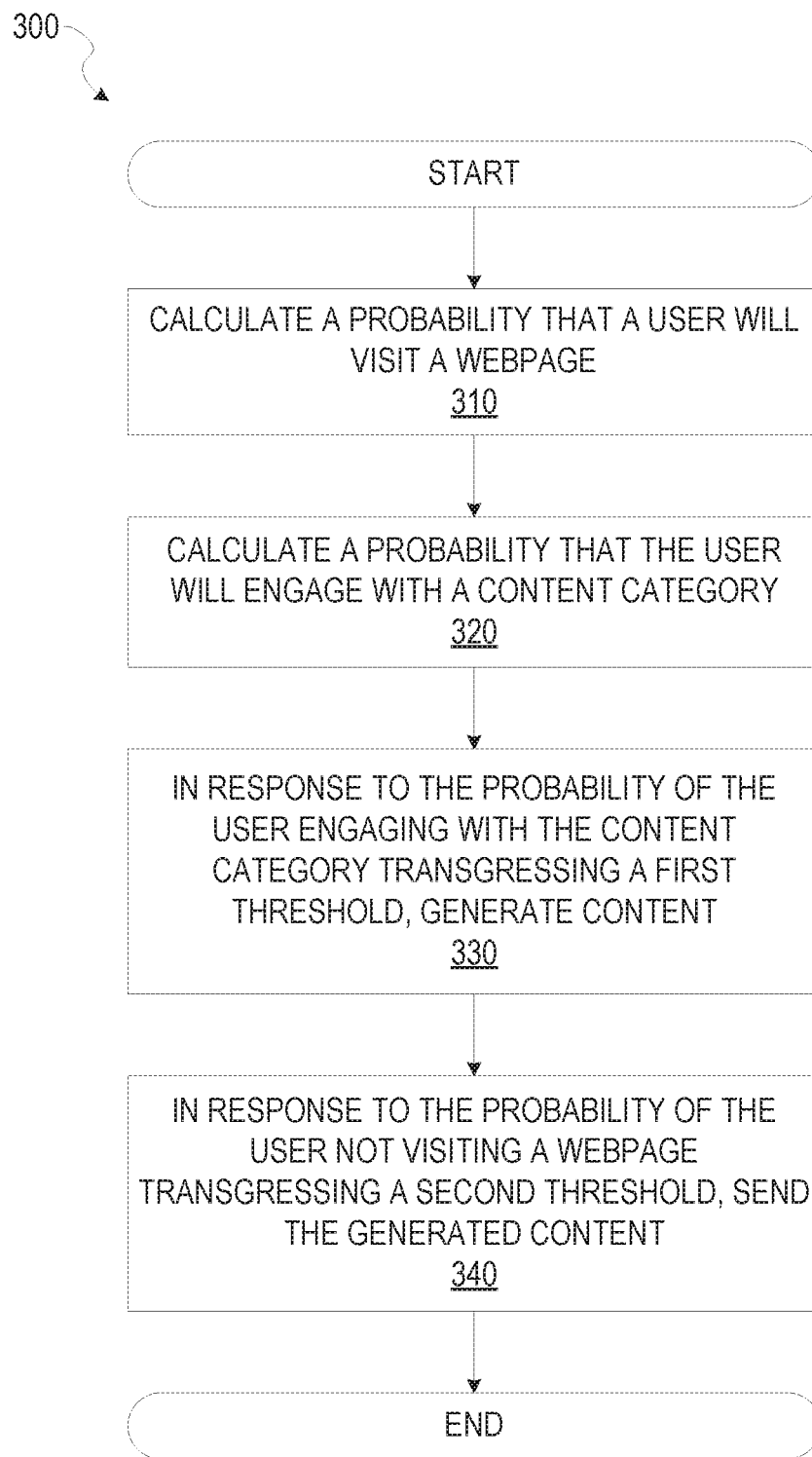
FIG. 3 is a flow diagram illustrating a method for generating specific content targeted to identified users with low predicted user engagement, according to an example embodiment.

FIG. 3 is a flow diagram illustrating an example method 300 for generating specific content targeted to identified users with low predicted user engagement. The operations of the method 300 may be performed by components of the content generation system 200.

At operation 310, the calculation module 230 calculates a probability whether a user will visit a webpage based on historical data. In some embodiments, the calculation module 230 updates the calculation at predetermined time intervals, depending on the user profile and/or past user engagement. In one embodiment, particular professions are associated with particular time intervals. For instance, assuming that a user profile shows that a user is an attorney by profession, the assumption is that the user has an office job that requires the user to at a desk for an extended period of time. In this regard, the calculation module 230 identifies that this profession has a predetermined period of time of seven days, indicating that the calculation module 230 updates the probability calculation every week. In another example, the predetermined period of time is dependent on past user engagement, where the historical data shows that on average, the user logs onto the social network every three weeks within the past year. In such a scenario, the user historical data shows that the rate of one log-in every three weeks in the user's behavior and therefore the calculation module 230 updates the calculation every three weeks. In this scenario, updating the calculation at a more frequently interval (e.g., every two days) will likely have a high resource cost with little change in the calculation outcome.

The calculation module 230 calculates the probability whether a user will visit being based on logistic regression models. The logistic regression model uses input variables of historical data, the historical data includes past log in history, latency between log in, number of times the user visited a webpage, the number of times the user engaged with a feed activity page, the number of times the user searched for a job, accepted an invitation, viewed a job recommendation, engaged with another member's activities, shared a content, liked a content, commented on a content, and the like. In other embodiments, the historical data includes activity data of other members identified to be similar to user, members identified to be similar to the user being based on a comparison between the user profile and the member profile. The comparison between user profile and the member profile includes comparing one or more user profile and member profile attributes, such as school attended, current job title, current company, interest, skill set, and other such attributes or combinations thereof. In other embodiments, the comparison is based on the shared user engagement interest, such as commenting and liking similar articles, following similar companies, following similar influencers, and the like.

At operation 320, the calculation module 230 calculates a probability whether the user will engage with a particular content category based on past user engagement. The calculation module 230 accesses one or more of the databases 128, 130, and 132 to calculate the probability of content engagement using past user engagement data. In some embodiments, past user engagement used to calculate the user's affinity to a specific content category is based on content feature and user feature. In general, content feature includes types of content that elicited any type of user engagement in the past, such as clicking, "liking," sharing, and commenting. In general, user feature includes information specific to the user such as user profile, user intent, the number of times the user commented, liked, shared, or engaged with a content, and the like.

At operation 330, in response to the probability of the user engaging with the particular content category transgressing (e.g., being equal to or greater than) a first threshold, the generation module 240 generates content from the particular content category. Where the probability of the user engaging with a content rises above a first threshold, there is a high chance the user has an affinity to the content based on past activities by the user. As a result, the content would be generated in order to re-engage the user when applicable. The system determined the category of that is of interest to the user based on past user engagement using machine learning model. Content is subsequently generated from such categories. For instance, based on past interaction, the machine learning model determines the user has usually engaged with content that expands the user's professional network, therefore, content generated are associated with expanding the user's professional network such as recommending other members that the user may connect with.

At operation 340, in response to the probability of the user not visiting a webpage being equal to and/or exceeding a second threshold, the presentation module 250 sends the generated content to the user. In some embodiments, the presentation module 250 determines the best channel of communication to send the generated content based on past user engagement. For instance, the presentation module 250 determines that the user has engaged more often in the past via push notifications rather than text-messaging channels or email. In such a scenario, the presentation module 250 sends the generated content via a push notification, rather than text-messaging or email. The type of communication channel differs from user to user depending on the past user interaction. For example, FIG. 6 shows a push notification being to a user to presented generated content. Details regarding the communication channel chosen for the specific user to present generated content are described in detail in associated with FIG. 5 and FIG. 6.

Figure 4:
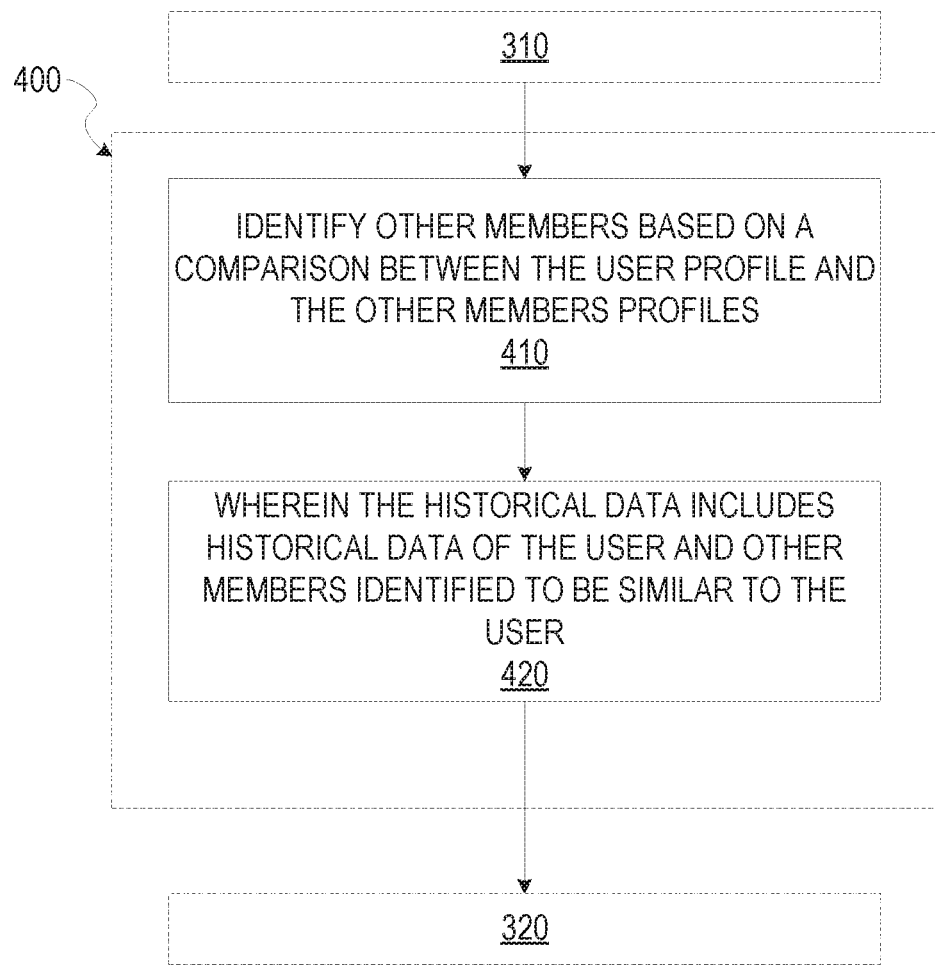
FIG. 4 is a flow diagram illustrating a method for calculating a probability that a user will visit a webpage based on historical data, according to an example embodiment.

FIG. 4 is a flow diagram illustrating an example method 400 for calculating a probability whether a user will visit a webpage based on historical data. The operations of the method 400 may be performed by components of the content generation system 200.

At operation 410, the calculation module 230 identifies other members based on a comparison between the user profile and the other members profiles. The calculation module 230 identifies other members that are similar to the user by comparing information associated with the user profile and information associated with other member profiles. For instance, the calculation module 230 compares and identifies other similar members within the social networking system 120 using information identified with respective member profiles, including comparing schools attended, current job title, past job titles, current company, past companies, interests, skills, and the like. Further, the calculation module 230 compares behavior activity of the user and the other members, the behavior activities include commenting, sharing, liking, clicking on articles, following similar companies, following similar influencers, and the like. The comparison may also include having similar first connections between the user and the other members. A first connection identifies that a first member of the social networking system 120 is directly connected to a second member, the first and second member being within each other's first connection. Other members who have a number of similar attributes from the comparison between member profile and comparison of member behavior activities (e.g., measured to be above a threshold number of similarities) are identified to be similar to the user.

At operation 420, the calculation module 230 calculates a probability that the user will visit a webpage based on historical data, wherein the historical data includes historical data of the user and other members identified to be similar to the user. The data of other members are used as inputs to calculate the probability whether the user will visit a webpage. Within machine learning models to predict probabilities, a large set of data point generally increase the accuracy of the prediction. Therefore, using other members data that are similar to that of the user increases the probability prediction of the user. Such operations are especially useful where the user has a low amount of data to use within the probability prediction model.

Figure 5:
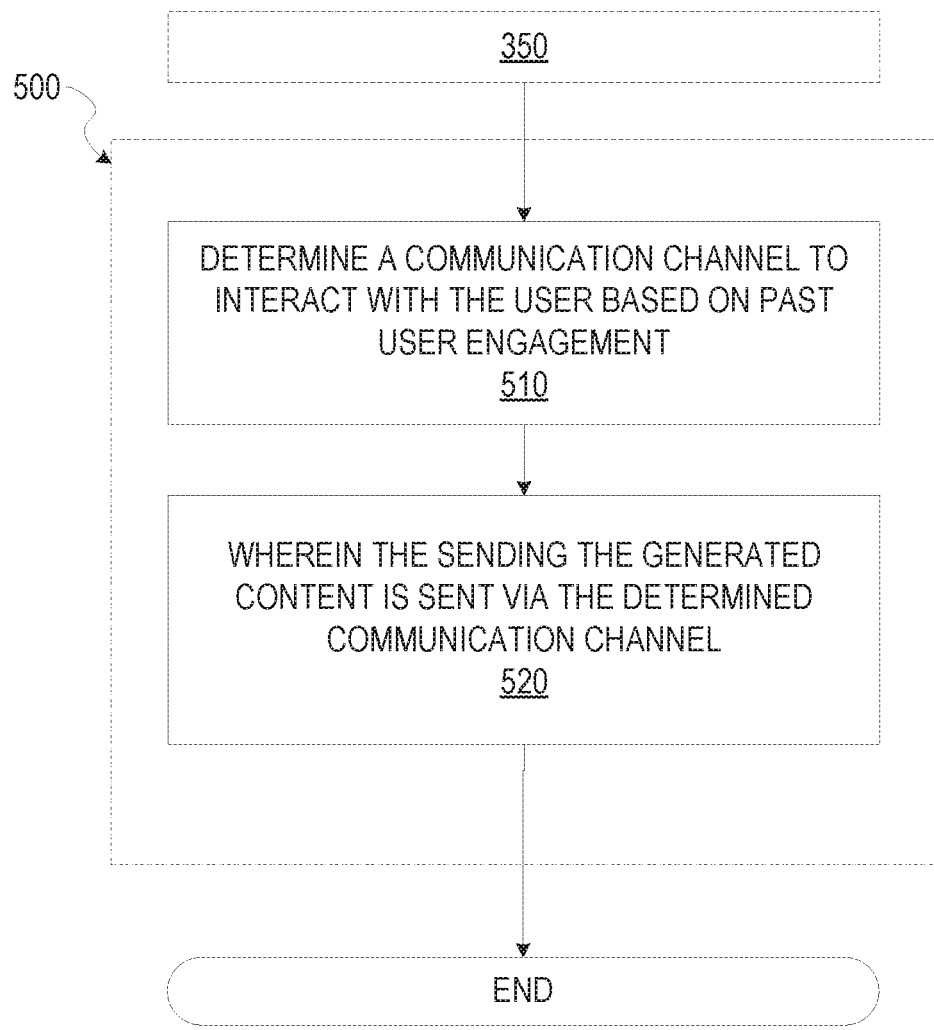
FIG. 5 is a flow diagram illustrating a method for determining a communication channel to interact with a user, according to some example embodiments.
Figure 6:
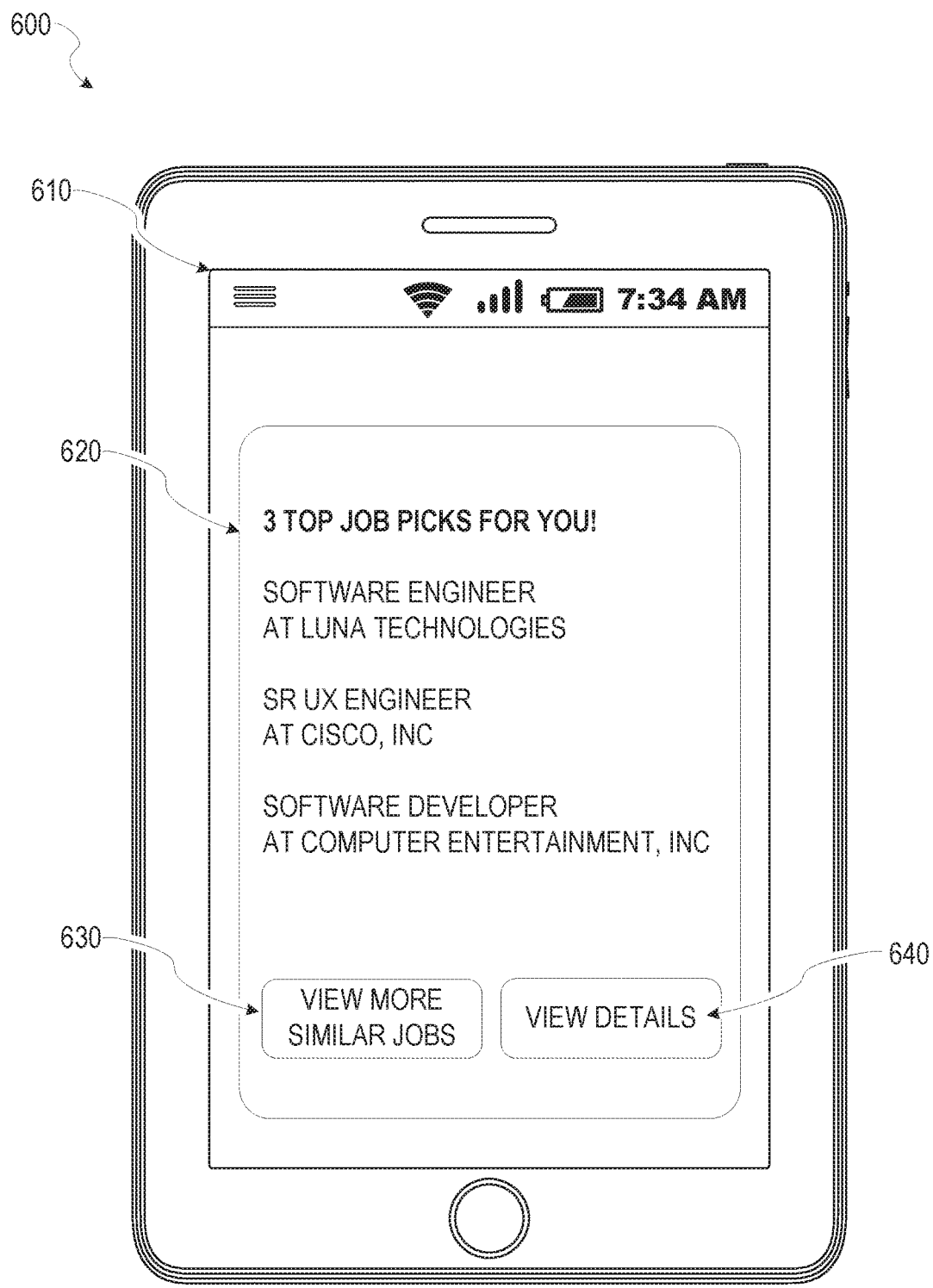
FIG. 6 illustrates a user interface that includes a generated content for the identified user, according to an example embodiment.

FIG. 5 is a flow diagram illustrating a method 500 for determining a communication channel to interact with a user. The operations of the method 500 may be performed by components of the content generation system 200.

At operation 510, the presentation module 250 determines a communication channel to interact with the user based on past user engagement. The presentation module 250 accesses past behavioral data of the user to determine the communication channel that the user has engaged with most frequently in the past. For instance, the one user may more frequently engage with emails that have been sent by the social networking system 120 in the past when compared to other messages that have been sent to the user. The presentation module 250 compares the number of actions taken by the user within all communication channels and selects the channel with the highest frequency of action taken. Messages being sent may be in the form of an email, text message, instant messenger, push notifications, third party application notification, and the like. An engagement is determined where the user selects some hyperlink within the sent message, thereby being a good indicator the user received the message and checks messages being sent via such a communication channel.

At operation 520, the presentation module 250 determines that the sending the generated content is sent via the determined communication channel. Maximizing the interaction with the user via a communication channel is just as important as tailoring a message content to a specific user. Therefore, determining the channel of communication that the user has engage with most frequently in the past further increases the user's engagement with the social networking system 120.

FIG. 6 depicts an example device 600 (e.g., a mobile device) displaying an example user interface 610 including generated content 620, and selectable interface 630 and 640. In an example, the presentation module 250 determines that the channel of communication that the user has engaged with most frequently in the past is via push notification. Therefore, the presentation module 250 sends the content generated by the generation module 240 via the push notification channel. For this example, the user has taken recent action to search for jobs several times within the past three weeks. The calculation module 230 determines that content containing jobs picks would have a high probability of engaging the user, the job picks would have similar job title to past searches by the user. In response to the probability of the user not visiting the social network 120 being below a predetermined threshold, the presentation module 250 presents the generated content 620 via the push notification channel. The push notification includes selectable interface 630 and 640, where the selectable interface 630 allows the user to view more similar jobs to the ones being presented to the user at generated content 620. The user may choose selectable interview 640 to view more details associated with the generated content 620 being presented. Further details may include first connections within the user's network who work at the companies of the available job being presented. The generated content 620 being presented may be a shortened version of the information available to the user, selecting selectable interface 640 may redirect the user to a webpage with the full details of all the jobs available for the user.

Figure 7:
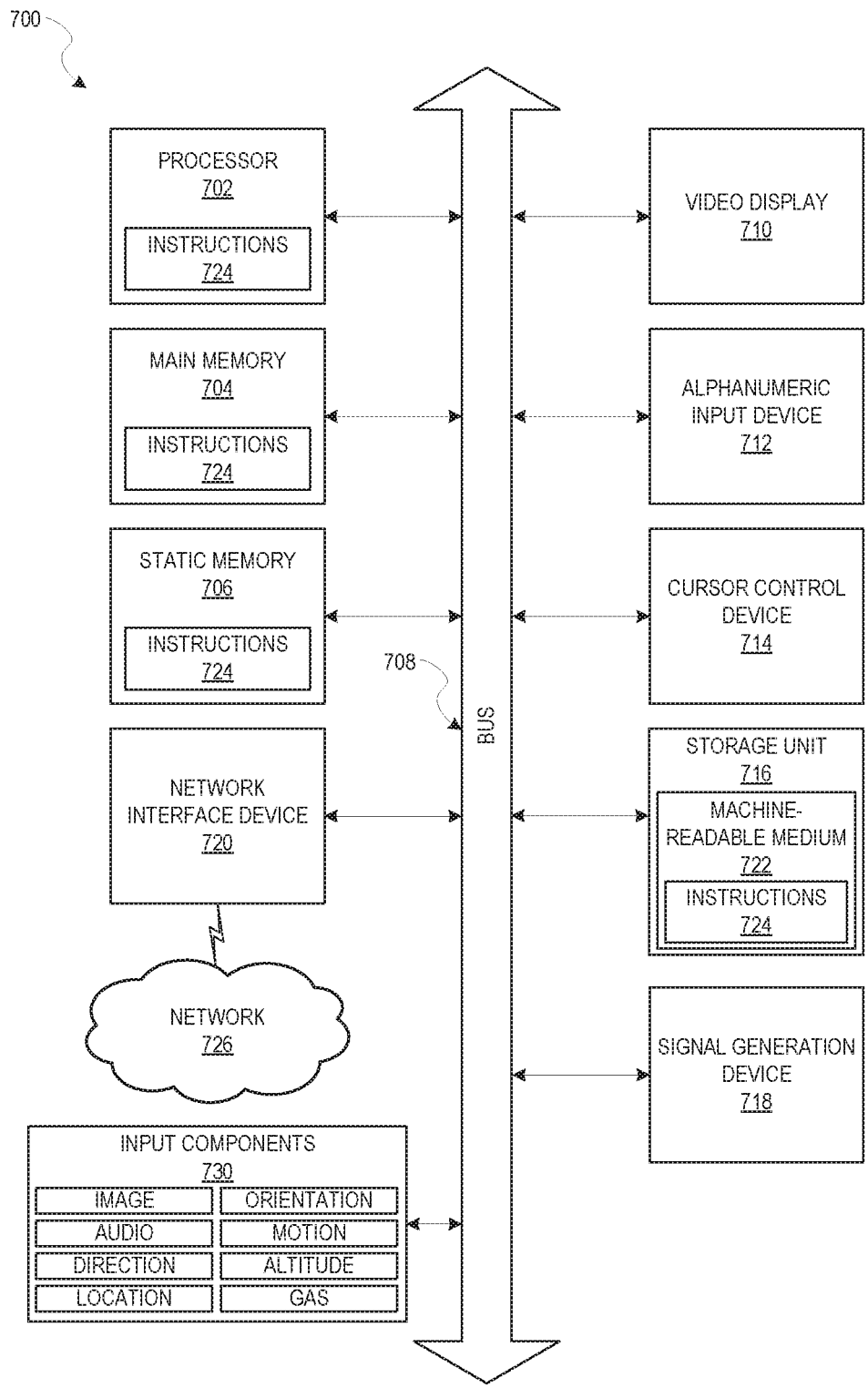
FIG. 7 illustrates a diagrammatic representation of a machine in the form of a computer system within which a set of instructions may be executed for causing the machine to perform any one or more of the methodologies discussed herein, according to an example embodiment.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 724 (e.g., software, a program, an application, an applet, an app, or other executable code) for causing the machine 700 to perform any one or more of the methodologies, associated with the content generation system 200, discussed herein may be executed. In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Any of these machines can execute the operations associated with the content generation system 200. Further, while only a single machine 700 is illustrated, the term "machine" shall also be taken to include a collection of machines 700 that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The machine 700 may further include a video display 710 (e.g., a plasma display panel (PDP), a light emitting diode (LED) display, a liquid crystal display (LCD), a projector, or a cathode ray tube (CRT)). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which is stored the instructions 724 embodying any one or more of the methodologies or functions described herein. The instructions 724 may also reside, completely or at least partially, within the main memory 704, within the static memory 706, within the processor 702 (e.g., within the processor's cache memory), or all three, during execution thereof by the machine 700. Accordingly, the main memory 704, static memory 706 and the processor 702 may be considered as machine-readable media 722. The instructions 724 may be transmitted or received over a network 726 via the network interface device 720.

In some example embodiments, the machine 700 may be a portable computing device, such as a smart phone or tablet computer, and have one or more additional input components 730 (e.g., sensors or gauges). Examples of such input components 730 include an image input component (e.g., one or more cameras, an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 722 able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions 724. The term "machine-readable medium" shall also be taken to include any medium, or combination of multiple media, that is capable of storing instructions (e.g., instruction 724) for execution by a machine (e.g., machine 700), such that the instructions, when executed by one or more processors of the machine 700 (e.g., processor 702), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof. The term "machine-readable medium" specifically excludes non-statutory signals per se.

Furthermore, the machine-readable medium 722 is non-transitory in that it does not embody a propagating signal. However, labeling the machine-readable medium 722 as "non-transitory" should not be construed to mean that the medium is incapable of movement; the medium should be considered as being transportable from one physical location to another. Additionally, since the machine-readable medium 722 is tangible, the medium may be considered to be a machine-readable device.

The instructions 724 may further be transmitted or received over a communications network 726 using a transmission medium via the network interface device 720 and utilizing any one of a number of well-known transfer protocols (e.g., hypertext transfer protocol (HTTP)). Examples of communication networks include a local area network (LAN), a wide area network (WAN), the Internet, mobile telephone networks (e.g. 3GPP, 4G LTE, 3GPP2, GSM, UMTS/HSPA, WiMAX, and others defined by various standard setting organizations), plain old telephone service (POTS) networks, and wireless data networks (e.g., WiFi and BlueTooth networks). The term "transmission medium" shall be taken to include any intangible medium that is capable of storing, encoding, or carrying instructions 724 for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium 722 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor 702, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 702 that are temporarily configured (e.g., by software) or permanently configured to perform the relevant operations. Whether temporarily or permanently configured, such processors 702 may constitute processor-implemented modules that operate to perform one or more operations or functions described herein. As used herein, "processor-implemented module" refers to a hardware module implemented using one or more processors 702.

Similarly, the methods described herein may be at least partially processor-implemented, with a processor 702 being an example of hardware. For example, at least some of the operations of a method may be performed by one or more processors 702 or processor-implemented modules. Moreover, the one or more processors 702 may also operate to support performance of the relevant operations in a "cloud computing" environment or as a "software as a service" (SaaS). For example, at least some of the operations may be performed by a group of computers (as examples of machines 700 including processors 702), with these operations being accessible via the network 726 (e.g., the Internet) and via one or more appropriate interfaces (e.g., an application program interface (API)).

The performance of certain of the operations may be distributed among the one or more processors 702, not only residing within a single machine 700, but deployed across a number of machines 700. In some example embodiments, the one or more processors 702 or processor-implemented modules may be located in a single geographic location (e.g., within a home environment, an office environment, or a server farm). In other example embodiments, the one or more processors 702 or processor-implemented modules may be distributed across a number of geographic locations.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   one or more hardware processors, and a computer-readable memory including instructions, which when executed by the one or more hardware processors, configure the system to perform a plurality of operations comprising:

calculating a probability that a user will not visit a webpage with a predetermined period of time, based on historical data about past visits to the webpage;

calculating a probability that the user will engage with a particular content category based on past user engagement;

in response to the probability of the user engaging with the particular content category being equal to or greater than a first threshold, generating content from the particular content category;

in response to the probability of the user not visiting a webpage meeting or exceeding a second threshold, sending the generated content to the user.

2. The system of claim 1, wherein:
the calculating of the probability that the user will visit a webpage is further based on user profile information associated with the user.

3. The system of claim 1, further comprising:
identifying other members of a social network service based on a comparison between the user profile and other members profiles associated with the other members; and
wherein the historical data includes historical data of the user and other members identified to be similar to the user.

4. The system of claim 1, wherein:
the historical data include activities that indicate the user engaged with a social network service.

5. The system of claim 1, wherein:
the calculating of the probability that the user will engage with a particular content category is further based on information specific to the user.

6. The system of claim 1, wherein:
the calculating of the probability that the user will engage with a particular content category is further based on a content feature that elicited past user action.

7. The system of claim 1, wherein:
the calculating of the probability that the user will visit a webpage is based on machine learning using a logistic regression model.

8. The system of claim 1 wherein:
the probability of the user visiting the webpage is further based on the user visiting the webpage within a predetermined time period.

9. The system of claim 1, wherein:
the user engaging with the content includes the user clicking on the content and is redirected to a corresponding webpage.

10. The system of claim 1, further comprising:
determining a communication channel to interact with the user based on past user engagement with the communication channel selected from a plurality of communication channels; and
wherein, the sending the generated content is sent via the determined communication channel.

11. A method comprising:
using one or more computer processors:
calculating a probability that a user will not visit a webpage with a predetermined period of time, based on historical data about past visits to the webpage;
calculating a probability that the user will engage with a particular content category based on past user engagement;
in response to the probability of the user engaging with the particular content category being equal to or greater than a first threshold, generating content from the particular content category; and
in response to the probability of the user not visiting a webpage meeting or exceeding a second threshold, sending the generated content to the user.

12. The method of claim 11, wherein:
the historical data includes a user profile for the user and member profiles of other members; and
identifying similar members that are similar to the user by comparing the user profile with respective member profiles of the other members.

13. The method of claim 11, wherein:
the calculating of the probability that the user will engage with a particular content category is further based on information specific to the user.

14. The method of claim 11, wherein:
the calculating of the probability that the user will engage with a particular content category is further based on a content feature that elicited past user action.

15. The method of claim 11, wherein:
the calculating of the probability that the user will visit a webpage is based on machine learning using a logistic regression model.

16. The method of claim 11, wherein:
the probability of the user visiting the webpage is further based on the user visiting the webpage within a predetermined time period.

17. The method of claim 11, wherein:
the user engaging with the content includes the user clicking on the content and is redirected to a corresponding webpage.

18. The method of claim 11, further comprising:
determining a communication channel to interact with the user based on past user engagement with the communication channel selected from a plurality of communication channels; and
wherein, the sending the generated content is sent via the determined communication channel.

19. A machine-readable medium not having any transitory signals and storing instructions that, when executed by at least one processor of a machine, cause the machine to perform operations comprising:
calculating a probability that a user will not visit a webpage based on historical data;
calculating a probability that a user will not visit a webpage with a predetermined period of time, based on historical data about past visits to the webpage;
in response to the probability of the user engaging with the particular content category being equal to or greater than a first threshold, generating content from the particular content category;
in response to the probability of the user not visiting a webpage meeting or exceeding a second threshold, sending the generated content to the user.

20. The machine-readable medium of claim 19, wherein the operations further comprise:
determining a communication channel to interact with the user based on past user engagement with the communication channel selected from a plurality of communication channels; and
wherein, the sending the generated content is sent via the determined communication channel.

* * * * *